(12) United States Patent
Frugier et al.

(10) Patent No.: US 6,491,090 B1
(45) Date of Patent: Dec. 10, 2002

(54) VEHICLE COMPRISING A HEATING/AIR-CONDITIONING INSTALLATION

(75) Inventors: Benjamin Frugier, Paris (FR); Laurent Grimaud, Paris (FR); Gilles Elliot, Courcouronnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/614,876

(22) Filed: Jul. 12, 2000

(51) Int. Cl.$^7$ ................................................ B60H 3/00
(52) U.S. Cl. ........................................ 165/43; 165/42
(58) Field of Search ............................ 165/41, 42, 43; 62/244, 324.1, 324.6; 237/2 A, 12.3

(56) References Cited

U.S. PATENT DOCUMENTS

| | | | |
|---|---|---|---|
| 3,209,551 A | * 10/1965 | Jentet ............................ | 165/42 |
| 3,830,077 A | * 8/1974 | Willen et al. .................. | 62/238 |
| 3,834,451 A | * 9/1974 | Kozinsji ........................ | 165/43 |
| 4,523,631 A | * 6/1985 | McKinney ..................... | 165/43 |
| 5,129,144 A | 7/1992 | Halstead et al. | |
| 5,497,941 A | * 3/1996 | Numazawa et al. ........... | 165/43 |
| 5,529,112 A | * 6/1996 | King et al. .................... | 165/42 |
| 5,641,016 A | 6/1997 | Isaji et al. | |
| 6,076,593 A | * 6/2000 | Takagi et al. .................. | 165/43 |
| 6,145,330 A | * 11/2000 | Goto et al. .................... | 165/43 |

FOREIGN PATENT DOCUMENTS

| | | |
|---|---|---|
| EP | 0566854 | 10/1993 |
| FR | 2761405 | 10/1998 |

* cited by examiner

*Primary Examiner*—Henry Bennett
*Assistant Examiner*—Terrell McKinnon
(74) *Attorney, Agent, or Firm*—Liniak, Berenato & White

(57) ABSTRACT

A vehicle with a heating/air-conditioning installation has, on the one hand, a heating and air-conditioning apparatus including a heating radiator, an evaporator and an air-distribution device and, on the other hand, a compressor and a condenser. The compressor is an electric compressor. The condenser is cooled by a cooling circuit supplied with a fluid other than air. The electric compressor and the condenser are housed in a space lying between the vertical plane passing through the axle of the front wheels of the vehicle and a vertical plane passing through the back of the seat backs of the front seats.

12 Claims, 4 Drawing Sheets

VEHICLE COMPRISING A HEATING/AIR-CONDITIONING INSTALLATION

FIELD OF THE INVENTION

The present invention relates to a vehicle comprising a heating and air-conditioning installation.

BACKGROUND OF THE INVENTION

Such vehicles are known which include, on the one hand, a heating/air-conditioning apparatus which comprises a heating radiator, an evaporator as well as an air-distribution device, which conventionally includes air intakes, a blower and a system of controlled flaps, and, on the other hand, a compressor and a condenser which interact functionally with the heating/air-conditioning apparatus.

It has been suggested that compressors driven by an electric motor be used in order to dissociate the operation of the compressor from the operation of the internal-combustion engine, in particular in order to overcome the degradation in air-conditioning performance which is generally observed with the engine idling. This technique, which requires a powerful electrical source in the vehicle, can be employed in the context of the change to an electrical power supply voltage of 42V or more.

It has also been suggested, especially in the French Patent Application No FR 2 761 405 filed on Mar. 27, 1997 by the Applicant, to use a water-cooled condenser in a refrigerating loop for motor-vehicle air conditioning.

The basic idea of the present invention is to take advantage of these progressive technological changes in order to obtain compactness of the topology of the installation.

One object of the invention is especially to allow shortening of the ducts and thus lower losses of pressure head, as well as the possibility of reducing the losses of refrigerant and/or a gain from the cost point of view and/or increased flexibility in the thermal and acoustic optimisation of the loop, given that the number of external factors interfering with the loop is limited.

SUMMARY OF THE INVENTION

According to the present invention there is provided a vehicle comprising a heating/air-conditioning installation comprising, on the one hand, a heating and air-conditioning apparatus which comprises a radiator, an evaporator and an air-distribution device and, on the other hand, a compressor and a condenser interacting functionally with the evaporator so as to form a thermal loop, wherein the compressor is an electric compressor, in that the condenser is cooled by a cooling circuit supplied with a fluid other than air, and in that the electric compressor and the condenser are housed in a space lying between a vertical plane passing through the axle of front wheels of the vehicle and a vertical plane passing through the back of seat backs of front seats of the vehicle.

Advantageously, the vehicle includes a functional unit, which forms a complete system, which can be housed in a casing, combining the said heating and air-conditioning apparatus, the electric compressor and the condenser.

The said circuit for cooling the condenser may feature a fluid-cooling exchanger and at least one exchanger for cooling at least one electrical power-supply module, this latter exchanger being arranged upstream of the condenser in the direction of circulation of the fluid in the cooling circuit. The fluid-cooling exchanger may be a heat-carrying fluid/air exchanger and the heat-carrying fluid may be water, or else a mixture of water and glycol.

The compressor and the condenser can be housed on the face of the bulkhead of the vehicle which lies on the engine-compartment side, or in the vicinity thereof.

The heating radiator and the condenser can be grouped together into a single exchanger called an integrated exchanger. The vehicle may then include a cockpit module incorporating the electric compressor, the said integrated exchanger and outlets for supplying heat-carrying fluid for the integrated exchanger.

The vehicle may include a mixing circuit provided with a mixing flap in order to direct air passing through the evaporator either in the form of a direct airflow, or in the form of an airflow diverted onto the integrated exchanger, or in the form of a mixture of these two flows.

BRIEF DESCRIPTION OF THE DRAWINGS

Other characteristics and advantages of the invention will emerge better on reading the description which will follow, given by way of non-limiting example, in connection with the drawings in which.

DESCRIPTION OF THE PREFERRED EMBODIMENTS

Figure 1:
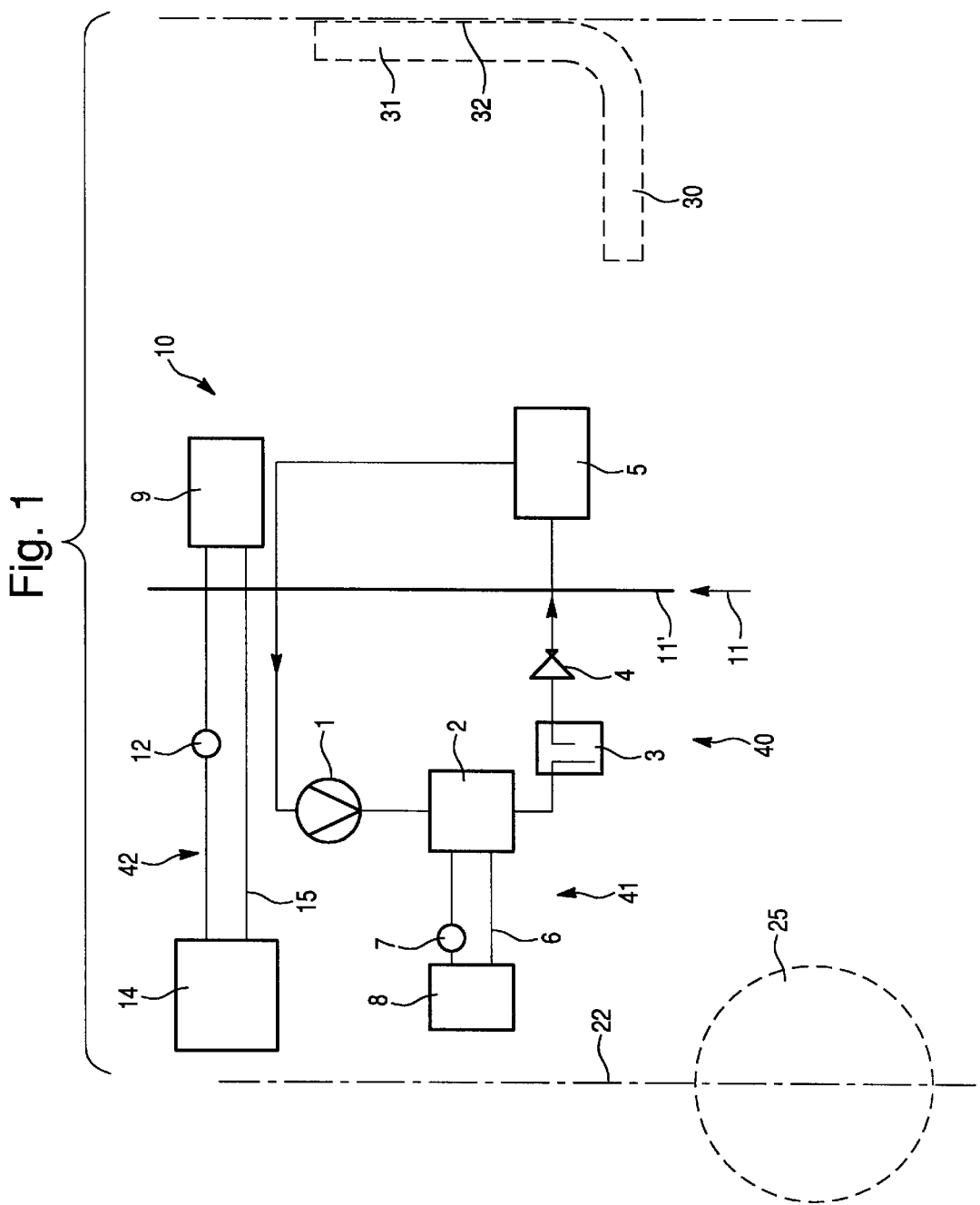
FIG. 1 represents an example layout of a heating/air-conditioning installation according to the invention.

In the various figures, like reference numerals indicate like parts.

A loop of an air-conditioning device conventionally includes a compressor, a condenser, an expansion bottle for the refrigerating fluid, a pressure-reducing valve and an evaporator.

Conventionally, a heating/air-conditioning apparatus comprises the evaporator, a radiator heated by water in a thermal relationship with the engine, water inlets, an air blower, air outlets, and a system of controlled flaps for managing the air circulation between the inlets (outside air and/or recirculated air) and the outlets (distribution of air at various points of the passenger compartment).

The components of the thermal loop (compressor, condenser, expansion bottle and pressure-reducing valve) which are not housed in the heating/air-conditioning apparatus constitute separate elements which are assembled during the assembly of the vehicle, having regard to the constraints on layout, in particular of the compressor and of the condenser, which implies, on the one hand, substantial lengths of pipework, giving rise to losses of pressure head, and, on the other hand, connections at the ends of this pipework, which amount to sources of leaks for the refrigerant liquid.

In accordance with the invention, the compressor is an electric compressor and the condenser is cooled by a fluid other than the fresh air available at the front of the vehicle. The condenser is thus cooled by a cooling loop in which flows a heat-carrying fluid such as water or a mixture of water and glycol.

The compressor and the condenser thus defined are placed as close as possible to the heating/air-conditioning apparatus, in a space available between the vertical plane passing through the axle of the front wheels and the plane passing through the back of the seat backs of the front seats. The definition of these positions of the compressor and of the condenser, needless to say, includes the underside of the passenger compartment and particularly the face 11' of the bulkhead 11 which is located on the engine-compartment 40 side. One possible position is the engine compartment as far as the axles of the two front wheels. Another possible position is the passenger compartment itself, by determining the spaces available in proximity to the instrument panel.

The invention makes it possible to construct a thermal loop of the shortest possible length and which can be grouped together around the evaporator, giving a shortening of the pipework and thus a smaller total volume of refrigerant fluid, a reduction in the losses of pressure head and in the degradation in performance which results therefrom, as well as a reduction in cost. The reduction in the length of the pipework and/or of the number of connections may also be a source of reduction of leaks of refrigerant, as is the use of an electric (hermetically sealed) compressor. The closer geographical grouping of the components also makes it possible to preassemble elements of the thermal loop, which allows the use of welded connections which are therefore guaranteed leaktight, which it cannot be envisaged employing on a vehicle-assembly line.

Referring to FIG. 1, a refrigeration thermal loop successively includes a compressor 1, a condenser 2, a bottle 3 constituting a reserve of refrigerant fluid, a pressure-reducing valve 4, and an evaporator 5 the outlet of which feeds the inlet of the compressor 1.

The compressor 1 is an electric compressor and the condenser 2 is cooled by a circuit 41 comprising a radiator 8. A line 6 supplied with a water/glycol mixture, which flows in it by virtue of a water pump 7, makes it possible to associate the transfer of heat energy from the condenser 2 to the radiator 8.

The air-conditioning apparatus 10 is housed in the vehicle passenger compartment, within the console. It features a blower, the evaporator 5, a heating radiator 9, as well as air inlets and outlets and a system of flaps, which are not represented.

The electric compressor 1, the condenser 2, the bottle 3 and the pressure-reducing valve 4 (or a calibrated orifice doing the same job) are arranged on the face of the bulkhead 11 which is situated on the engine compartment side. It is seen that in this way the loop through which the refrigerant fluid runs exhibits a reduced length.

The radiator 9 for heating the passenger compartment is arranged in the air-conditioning apparatus and it is heated by a circuit 42 supplied with cooling water, for example the cooling water from the vehicle's internal-combustion engine, by virtue, for example, of a circulation pump 12 connected to the radiator 14 of the vehicle via a circulation circuit 15.

In general, it is possible to arrange the electric compressor 1, the condenser 2, the bottle 3 and the pressure-reducing valve 4 in the space lying between the vertical plane 22 passing through the axle of the vehicle's front wheels 25, and the vertical plane 32 passing through the back of the seat backs 31 of the front seats 30.

Figure 2:
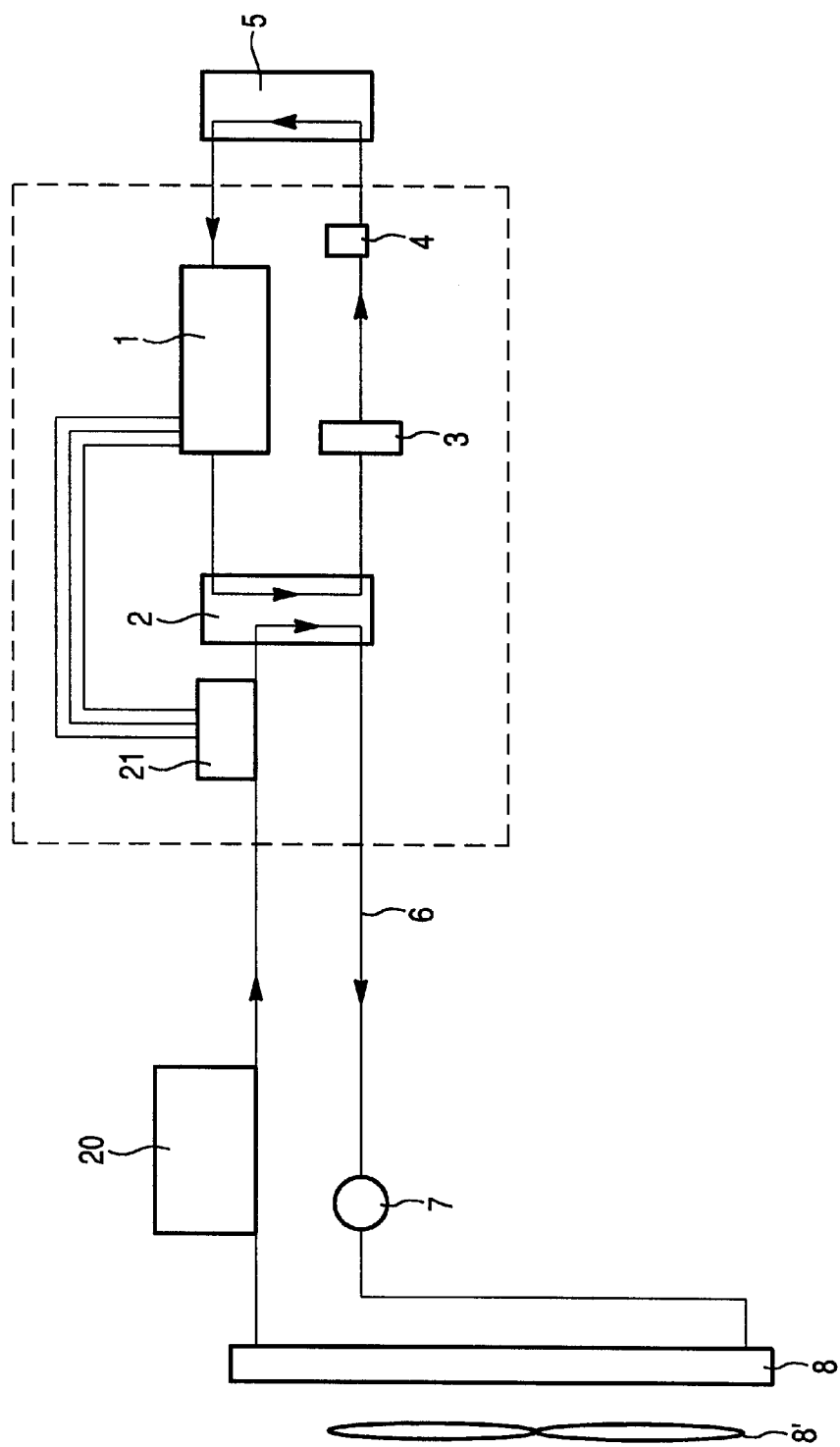
FIG. 2 represents a first embodiment of a thermal loop implementing the invention.

By reference to FIG. 2, it is seen that the condenser is cooled by a cooling loop 6 comprising a pump 7, a radiator 8, a fan 8' associated with the radiator 8. This cooling loop is preferably used in addition to cool the electronics 20 for supplying power to the vehicle at 42V and the module 21 (inverter) for supplying electric power to the electric compressor 1, this cooling advantageously taking place upstream of the condenser 2 in the direction of circulation of the fluid (for example water+glycol) in the loop. The cooling loop 6 constitutes a so-called "low-temperature" water circuit, which supplies cooling water at a temperature below 70° C., that is to say a temperature which is sufficiently low to allow cooling of the electronics.

The system represented in FIG. 2 makes it possible to deliver a complete system in the form of a preassembled module (heating/air-conditioning apparatus, compressor, condenser, and bottle if appropriate), which can be deposited in a preferably hermetically sealed casing, which makes it possible to ensure good control of the problems of noise and/or of leaks of a refrigerating fluid, as well as thermal protection with regard to the engine environment.

The preassembled module or unit may include a structural element of the vehicle and/or a steering column and/or an airbag and/or a pedal assembly and/or a motor and drive members for the windscreen wipers of the vehicle, and/or a water separator for an air inlet into the passenger compartment and/or at least one air-cleaner filter housing and/or at least one display element.

Figure 3:
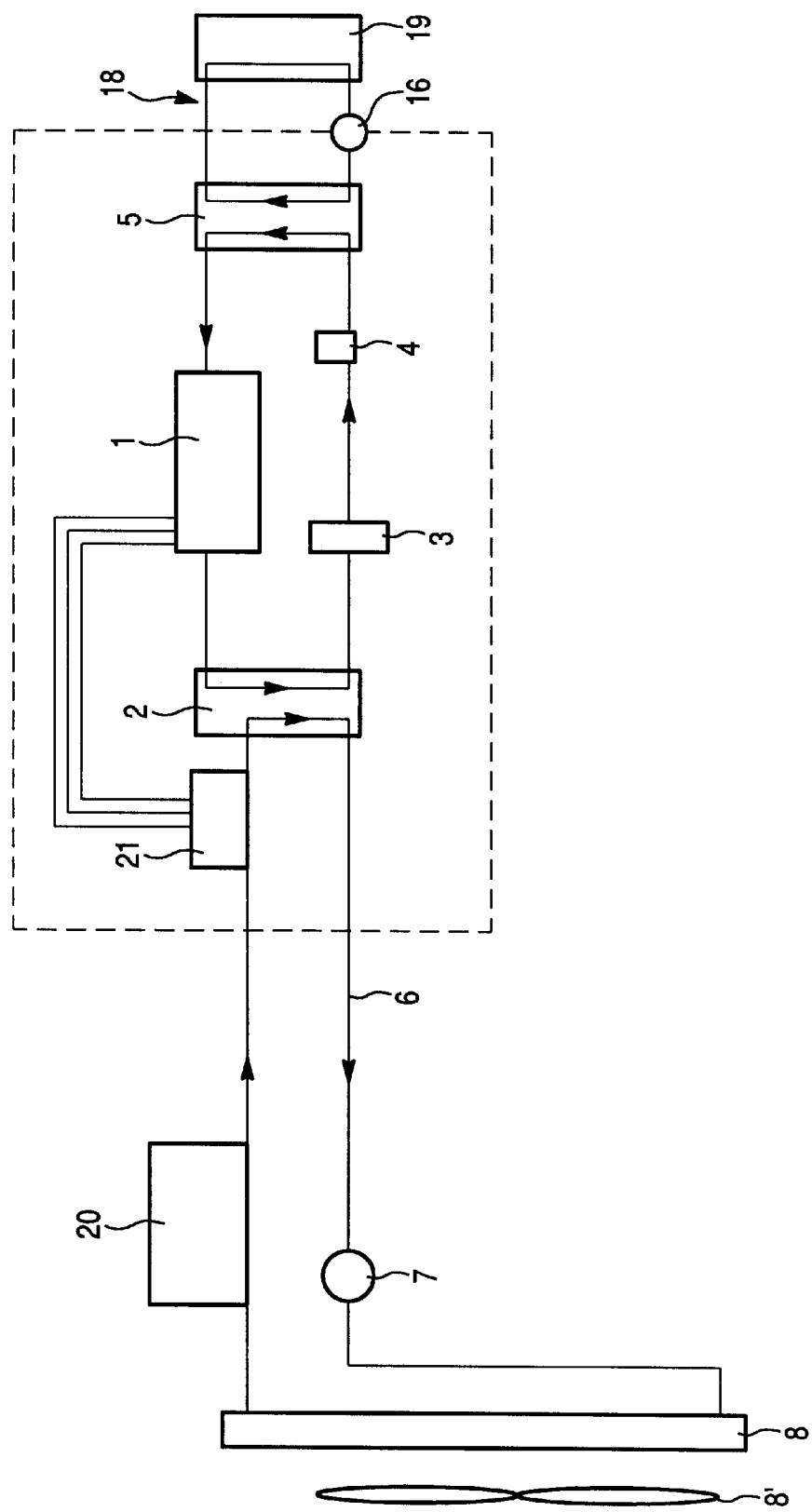
FIG. 3 represents a second embodiment of a thermal loop implementing the invention.

In the embodiment of FIG. 3, the evaporator 5 is in a thermal relationship with an air-water exchanger 19 by way of a closed water-circulation circuit 18 featuring a pump 16.

Figure 4A:
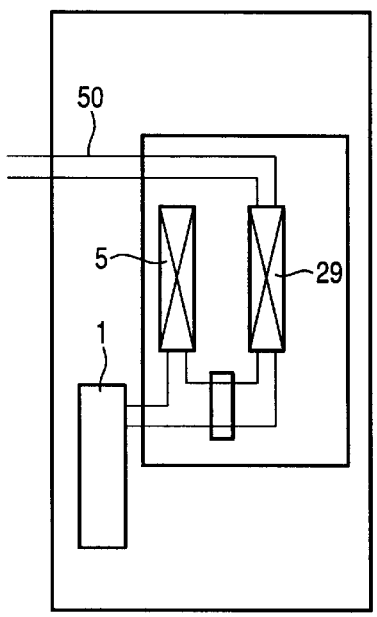
FIGS. 4a and 4c represent an integration of an installation according to the invention into a cockpit module.
Figure 4B:
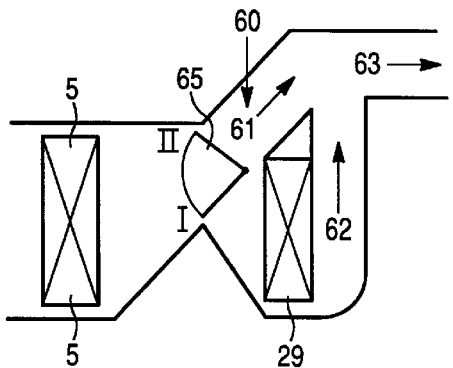
Figure 4C:
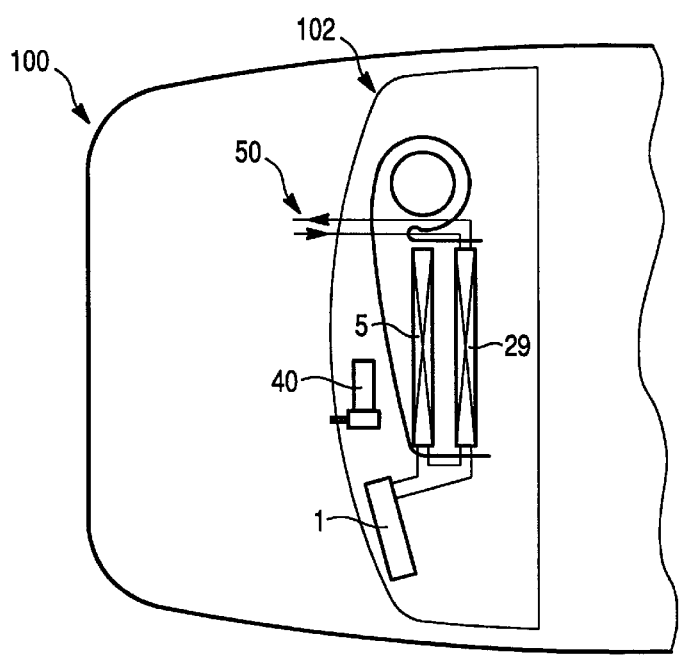

Because the invention makes it possible to group together geographically the elements of the heating/air-conditioning installation, it is possible to group together, into a single exchanger, the heating radiator 9 and the condenser 2 which in both cases are cooled by a heat-carrying fluid such as water. This is because the heating radiator 9 operates only in cold weather or in order to dehumidify, and the condenser 2 operates only in hot weather or in order to dehumidify. An exchanger 29 (called "integrated exchanger"), bringing together the heating radiator 9 and the condenser 2 can function in both modes by routing the refrigerating and/or heat-carrying fluids appropriately. This further makes it possible to dispense with one of the circuits 41 and 42. This allows an integration into a cockpit module which is illustrated in FIGS. 4a to 4c. The evaporator 5 and the integrated exchanger 29 are grouped together into a module also comprising at least the electric compressor 1 (FIG. 4a), and cooling outlets 50 of the exchanger 29.

This cockpit module 102 installed on a car 100 (FIGS. 4b and 4c) incorporates an air-distribution vent 60 comprising a mixing flap 65. The airflow output by the evaporator 5 is directed in the form of a direct airflow 61, or in the form of a diverted flow 62 which passes through the exchanger 29. In intermediate positions of the flap 65 (mixing on the air) the direct airflow 61 and the diverted flow 62 are mixed to form a recombined flow 63. There are thus three operating modes. In hot weather (air conditioning), the flap 65 is in its position I and all the air passing through the evaporator becomes a direct airflow 61. In intermediate weather (mixing on the air mode), the flap 65 is in a mixing position and the air output by the evaporator is separated into a direct airflow 61 and a diverted airflow 62 which recombine into a recombined airflow 63. In cold weather, the air conditioning is inactive and the exchanger 29 serves as a heating radiator. The flap is then in its position II and all the air which passes through the evaporator 5 (which is inactive) passes through the exchanger 29, which then performs the function of a heating radiator.

The invention applies also to the case of motor buses or of lorries for which several conditioned-air loops may be placed in parallel on a main water circuit, which means in this case that there is a single water circuit for plural conditioned-air circuits.

What is claimed is:

1. A vehicle comprising a heating/air-conditioning installation comprising, on the one hand, a heating and air-conditioning apparatus which comprises a heating radiator, an evaporator and an air-distribution device and, on the other hand, a compressor and a condenser interacting functionally with the evaporator so as to form a thermal loop, wherein the compressor is an electric compressor, wherein the condenser is cooled by a cooling circuit supplied with a heat-carrying fluid other than air, and wherein the electric compressor and the condenser are housed in a space lying between a vertical plane passing through the axle of front wheels of the vehicle and a vertical plane passing through the back of seat backs of front seats of the vehicle.

2. The vehicle of claim 1, wherein it includes a preassembled unit combining the said heating and air-conditioning apparatus, the electric compressor and the condenser.

3. The vehicle according to claim 2, wherein the said preassembled unit is arranged in a casing.

4. The vehicle of claim 2, wherein the preassembled unit includes at least one of a structural element of the vehicles, a steering column, an airbag, motor and drive members for the windscreen wipers, a water separator for an air inlet into the passenger compartment, an air cleaner filter housing and a display element.

5. The vehicle of claim 1, wherein the said circuit for cooling the condenser features an exchanger for cooling the said heat-carrying fluid and at least one exchanger for cooling at least one electrical power-supply module, this latter exchanger being arranged upstream of the condenser in the direction of circulation of the fluid in the cooling circuit.

6. The vehicle of claim 5, wherein the said fluid-cooling exchanger is a heat-carrying fluid/air exchanger.

7. The vehicle of claim 1, wherein the said heat-carrying fluid is water or a mixture of water and glycol.

8. The vehicle of claim 1, wherein the compressor and the condenser are housed on the face of the bulkhead of the vehicle which lies on the engine-compartment side, or in the vicinity thereof.

9. The vehicle of claim 1, wherein the heating radiator and the condenser are grouped together into a single integrated exchanger.

10. The vehicle of claim 9, wherein it comprises a cockpit module incorporating the electric compressor, the evaporator, the integrated exchanger and outlets for supplying the said integrated exchanger with heat-carrying fluid.

11. The vehicle of claim 9, wherein it includes a mixing circuit provided with a mixing flap in order to direct air passing through the evaporator either in the form of a direct airflow, or in the form of an airflow diverted towards the said integrated exchanger, or in the form of a mixture of these two flows.

12. The vehicle of claim 10, wherein it includes a mixing circuit provided with a mixing flap in order to direct air passing through the evaporator either in the form of a direct airflow, or in the form of an airflow diverted towards the said integrated exchanger, or in the form of a mixture of these two flows.

\* \* \* \* \*